US009319277B2

(12) United States Patent
Means

(10) Patent No.: US 9,319,277 B2
(45) Date of Patent: Apr. 19, 2016

(54) NETWORK ROUTER EMPLOYING ENHANCED PREFIX LIMITING

(75) Inventor: Israel Means, Chula Vista, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1509 days.

(21) Appl. No.: 11/939,855

(22) Filed: Nov. 14, 2007

(65) Prior Publication Data

US 2009/0125613 A1    May 14, 2009

(51) Int. Cl.
*G06F 15/177* (2006.01)
*H04L 12/24* (2006.01)
*H04L 12/701* (2013.01)

(52) U.S. Cl.
CPC ............... *H04L 41/12* (2013.01); *H04L 45/00* (2013.01)

(58) Field of Classification Search
CPC ...... H04L 12/4641; H04L 41/12; H04L 45/00
USPC .......................................................... 709/220
See application file for complete search history.

(56) References Cited

U.S. PATENT DOCUMENTS 7,106,691 B1 *   9/2006   DeCaluwe et al. ........... 370/229
7,418,519 B1 *   8/2008   Chavali .......................... 709/242

2003/0137974 A1   7/2003   Kwan et al.
2004/0255161 A1  12/2004   Cavanaugh
2004/0258002 A1  12/2004   Tran et al.
2005/0195835 A1   9/2005   Savage et al.
2006/0193329 A1 *  8/2006   Asati ........................ 370/395.53

OTHER PUBLICATIONS

Cisco Systems, EIGRP Prefix Limit Support, 2005.*
EIGRP Prefix Limit Support, Cisco Systems, Inc., San Jose, CA USA, 2005.

* cited by examiner

*Primary Examiner* — Andrew Georgandellis
(74) *Attorney, Agent, or Firm* — Jackson Walker L.L.P.

(57) ABSTRACT

A disclosed method of managing a provider edge (PE) router includes defining a neighbor specific prefix limit and a neighbor specific restart parameter applicable to a neighbor of the PE router. The neighbor may be a customer edge (CE) router connected to the PE router. A neighbor specific count of prefixes advertised by the CE router is monitored against the prefix limit. When a neighbor specific prefix limit violation occurs, the PE-to-CE connection is suspended for a duration determined at least in part by the restart parameter and then automatically resumed. The PE router may define an address family prefix limit and an address family restart parameter applicable to the CE router's address family. Violations of the address family prefix limit may result in temporary suspension of all connections between the PE router and the members of the address family.

26 Claims, 4 Drawing Sheets

NETWORK ROUTER EMPLOYING ENHANCED PREFIX LIMITING

BACKGROUND

1. Field of the Disclosure

The subject matter disclosed herein is in the field of data processing networks and, more particularly, the operation of routers within such networks.

2. Description of the Related Art

The routing of datagrams from a destination network address to a source network address is facilitated in many data processing networks, including the Internet, by a set of interconnected routers. Network routers maintain data that is indicative of the topology of at least some portion of the data processing network. The topology information is used to guide or route data from its source to its destination along a network path that is efficient in at least some respects. Routers may transmit messages to each other from time to time to convey network topology information. In some networks, for example, routers can "advertise" network topology information by transmitting unsolicited information about the network topology to other routers.

DESCRIPTION OF THE EMBODIMENT(S)

Figure 1:
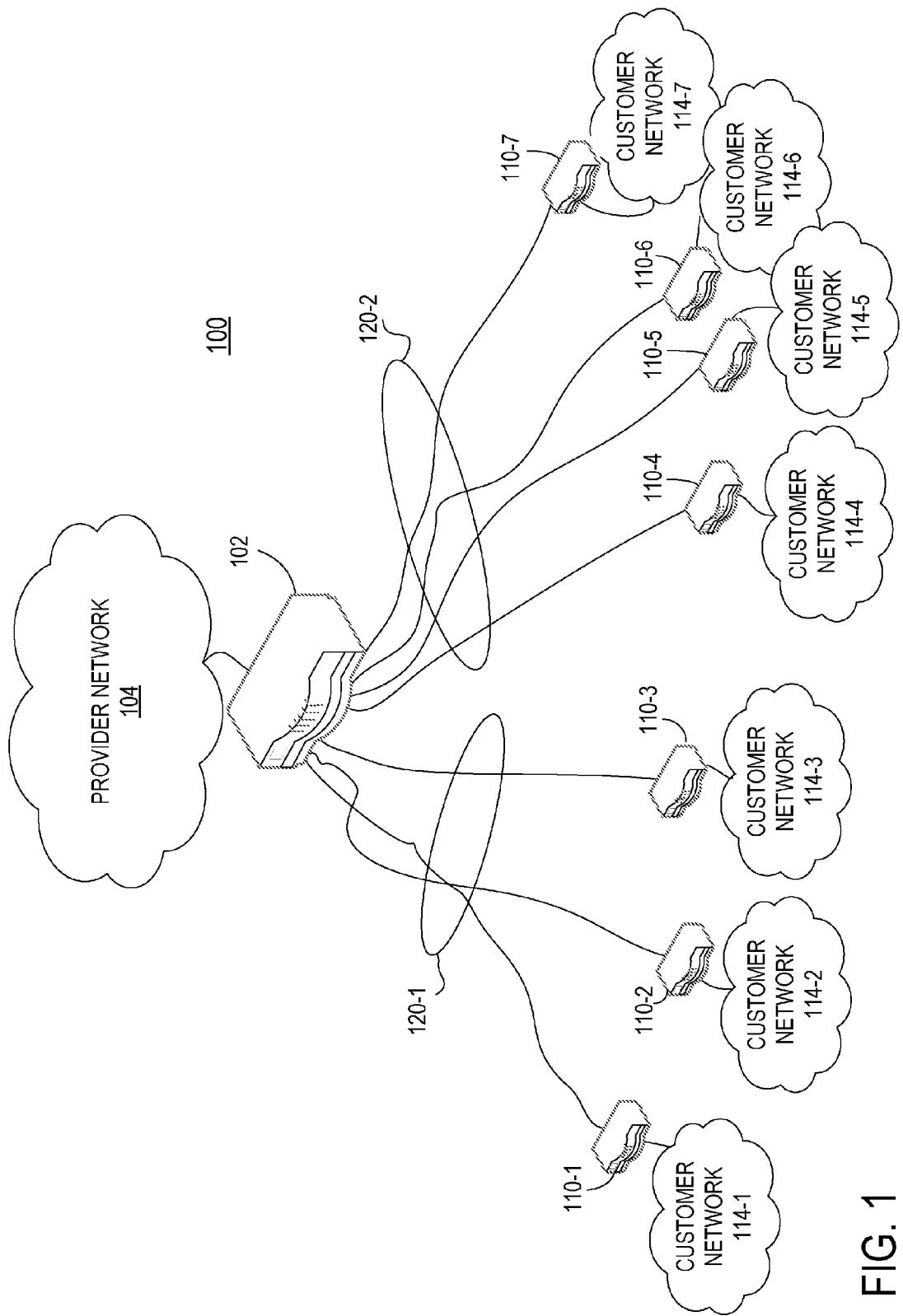
FIG. 1 is a block diagram of selected elements of an embodiment of a data processing network emphasizing the use of routers within the network.

In one aspect, a disclosed provider edge (PE) network router, referred to herein simply as a PE router, stores network topology information including neighbor information identifying neighboring routers, i.e., routers connected to the PE router, and address family information indicative of a plurality of associated neighboring routers. An address family, for example, may encompass all neighboring routers associated with a particular customer of a service provider associated with the PE router. The PE router may further include neighbor specific prefix limit data and address family prefix limit data. The neighbor specific prefix limit data may define prefix limits applicable to a single specified neighboring router. The address family prefix limit data may define prefix limits applicable to any or all of the associated neighboring routers. The disclosed PE router may include a maintenance module operable to monitor prefix advertisements sent by neighboring routers. If the maintenance module detects prefix advertisements from the single specified neighboring router in excess of the neighbor specific prefix limit, the maintenance module suspends peering between the specified neighboring router and the PE router for a suspension interval determined at least in part by restart information contained in the neighbor specific prefix limit data. At the conclusion of the suspension duration, a connection between the PE router and the neighboring router is resumed.

In another aspect, a disclosed method of managing a PE router includes defining a neighbor specific prefix limit and a neighbor specific restart parameter applicable to a neighbor of the PE router. The neighbor may represent a customer edge (CE) router and the neighbor may be directly connected to the PE router. A neighbor specific count of prefixes advertised by the second CE router is monitored. Responsive to a neighbor specific prefix limit violation in which the count exceeds the neighbor specific prefix limit, a connection between the first and second routers is suspended for a duration determined at least in part by the restart parameter and thereafter, the connection is automatically resumed. An address family prefix limit and an address family restart parameter, applicable to an address family to which the second router is a member, may be defined. Counts of prefixes advertised by all members of the address family may be monitored. If any of the counts exceeds the address family prefix limit, peering between the first router and the members of the address family may be suspended for a duration determined at least in part by the address family restart parameter. The connections may be automatically resumed after the suspension expires. The members of the address family may be routers associated with a particular customer of an operator of the first router. The members of the address family comprise a virtual route forwarding entity recognized by the first router. A neighbor specific restart count, indicative of the number of prefix limit violations, may be maintained and the suspension duration may be determined at least in part by the neighbor specific restart count. The suspension duration applicable to successive neighbor specific limit violations may be greater than, less than, or equal to the suspension duration imposed for a previous neighbor specific limit violation. Neighbor specific dampening may be supported wherein a decay factor is determined when the neighbor specific prefix limit occurs. The decay factor may influence the suspension duration. The decay factor may diminish exponentially with the elapsed time at which a prefix limit violation occurs such that prefix limit violations that occur quickly may result in longer suspensions than prefix limit violations that occur less quickly. The PE and CE routers may employ an Enhanced Interior Gateway Routing Protocol (EIGRP).

In still another aspect, a disclosed computer program product includes instructions, stored on a tangible computer readable medium, for managing connections between a PE router and a plurality of CE routers. In this aspect, the computer program product instructions, when executed, may maintain a set of counts where each count indicates the number of prefixes advertised by a respective CE router. The set of CE routers comprise members of an address family recognized by the PE router. The computer program product may detect a count exceeding a neighbor specific prefix limit and identify a CE router corresponding to the detected count. The computer program product may further determine a suspension duration and suspend a connection between the identified CE router and the PE router while maintaining connections between the PE router and at least one other of the CE routers for the determined duration. The computer program product may automatically resume the connection between the identified CE router and the PE router at a conclusion of the duration. The computer program product may determine the suspension duration based at least in part on a restart parameter defined for the identified CE router and/or based at least in part on a time varying decay factor. The decay factor may be a function of an elapsed time when the count exceeded the neighbor specific limit and the decay factor may diminish exponentially with the elapsed time. The suspension duration may also be based at least in part on a value of a restart count. The restart count may indicate the number of times an identified CE router has previously exceeded its neighbor specific prefix limit.

In some embodiments, the suspension interval may vary from a first instance of a neighboring router exceeding its prefix limit to a second instance. In some embodiments, the suspension interval increases in the second instance while, in other embodiments, the suspension interval decreases in the second instance. The suspension interval may include a dampening factor. In some embodiments, the PE router is compliant with an EIGRP. In some embodiments, the address family encompasses a set of neighboring routers defined by a virtual route forwarding table.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 102-1 refers to an instance of a widget class, which may be referred to collectively as widgets 102 and any one of which may be referred to generically as a widget 102.

Referring now to the drawings, FIG. 1 is a block diagram of selected elements of an embodiment of a data processing network 100. Data processing network 100 as shown emphasizes the configuration of routers within the network to demarcate a service provider's network from the networks of the provider's customers. As shown in FIG. 1, a PE router 102 is connected to a set of CE routers 110-1 through 110-7. In the depicted implementation of data processing network 100, PE router 102 is directly connected to each of the CE routers 110. For purposes of this disclosure, directly connected refers to a connection between two routers that does not include an intervening router.

PE router 102 provides a gateway for a service provider network 104 while each CE router 110 provides a gateway for a corresponding customer network 114. Each connection between PE router 102 and a CE router 110 as shown is associated with a port 112 of PE router 102. In the depicted embodiment, the CE routers 110 are grouped into two address families labeled in FIG. 1 as VRF-A 120-1 and VRF-B 120-2, where VRF is an acronym for virtual route forwarding. PE router 102 as shown in FIG. 1 recognizes two different address families or VRFs 120, each of which may be associated with a particular customer of the service provider.

Routers 102 and 110 may communicate network topology information with each other. In some embodiments, CE routers 110 may send network topology information that identifies networks, also sometimes referred to as prefixes in reference to the higher order bits of a standard IP address being used as network identifiers. The process of CE router 110 sending prefix information to PE router 102 is sometimes referred to as advertising a prefix. CE routers 110 advertise prefixes to PE router 102 to have an impact on the manner in which PE router 102 routes traffic. The advertise prefixes represent networks to which an advertising CE router 110 is connected. PE router 102 may store and use advertised prefixes to define its own routing table, which is a table of information that determines how PE router 102 routes datagrams depending on the destination address of a datagram.

Disclosed herein are methods and systems enabling PE router 102 to monitor and control the ability of CE routers 110 to advertise prefixes. In some embodiments, for example, PE router 102 may support the use of prefix limits. Prefix limits, as suggested by their name, refer to limitations on the number of prefixes CE routers 110 may advertise. The prefix limits may be specified in terms of prefixes advertised per unit of time. Prefix limits may be implemented on an address family basis or on a neighbor specific basis. An address family prefix limit may define a limit on the number of prefixes that any one CE router 110 may advertise during a specified interval. In other embodiments, address family prefix limits may be applied on a cumulative basis such that, for example, the maximum number of prefixes permitted refers to the number of prefixes advertised by all CE routers 110 in the address family. When an address family prefix limit is violated, some embodiments suspend peering between PE router 102 and all of the CE routers 110 within the address family 120. The suspending of peering may be controlled by a restart timer that defines how long a suspended CE router 110 must remain so.

In addition to the use of address families, some embodiments of PE router 102 may implement or support the concept of neighbor specific prefix limits that may incorporate restart and dampening concepts. Restart, as mentioned above, refers to a duration following a prefix limit violation during which peering between the offending CE router 110 and PE router 102 is suspended. Dampening, as used herein, refers generally to the concept of including a time varying component, referred to as a decay penalty, in the calculation of the restart timing. If a prefix limit is exceeded quickly after a peering session is established, the decay penalty is greater and the restart value may be longer than otherwise. In some embodiments, the decay penalty decreases exponentially and is specified by indicating an initial value of the decay penalty and a duration of the decay penalty's half life.

The routers shown in data processing network 100 may be compliant with a pervasively implemented routing protocol including, for example, an Interior Gateway Protocol (IGP) such as the Interior Gateway Routing Protocol (IGRP) and EIGRP both of which are proprietary protocols of Cisco, Inc. EIGRP is an advanced hybrid routing protocol that includes optimizations to minimize routing instability following topology changes. The routing optimizations are largely based on the Diffusing Update Algorithm (DUAL), which guarantees loop-free operation. For example, DUAL avoids the "count to infinity" behavior common in distance-vector routing protocols when a destination becomes completely unreachable. The maximum hop count of EIGRP-advertised routes (i.e., destination networks) is 224. EIGRP has a lower maximum hop count than IGRP, 224 for EIGRP and 255 for IGRP.

Figure 2:
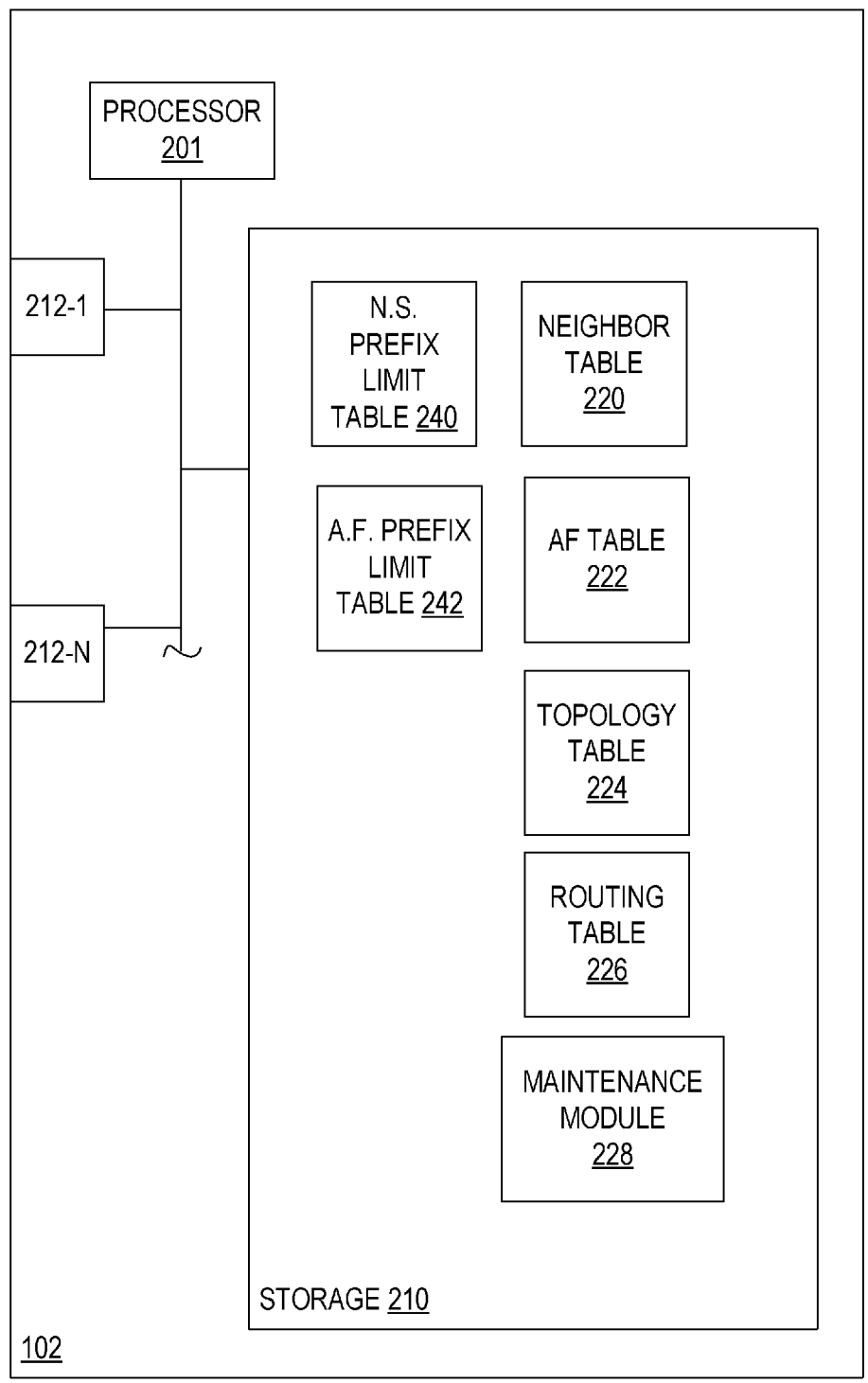
FIG. 2 is a block diagram of selected elements of an embodiment of a router suitable for use in the data processing network of FIG. 1.

Referring now to FIG. 2, a block diagram depicts selected elements of an embodiment of PE router 102 of FIG. 1. As depicted in FIG. 2, PE router 102 includes a processor 201 and a storage resource 210 accessible to processor 201. Processor 201 may be implemented as a general purpose microprocessor, an embedded processor, and so forth. PE router 102 as shown further includes a set of ports 212, two of which are shown as 212-1 and 212-n, where each port 220 supports an interface to a neighboring router.

Storage resource 210 encompasses substantially any type of computer readable medium on which computer executable instructions may be stored or embedded. Storage resource 210 may include memory elements including dynamic random access memory (DRAM) elements, static random access memory (SRAM) elements, flash memory elements, optical disk based memory including DVDs and CDs, magnetic storage medium, including one or more hard disks, and so forth.

Some embodiments of the disclosed subject matter are implemented as computer program products. A computer program product refers to a tangible computer readable medium on which are stored or embedded computer executable instructions for maintaining a router. FIG. 2 depicts some of the computer program product elements, sometimes referred to herein as modules, that are included in the exemplary implementation.

As depicted in FIG. 2, storage resource 210 includes data structures in the form of data tables including a neighbor table 220, a topology table 224, a routing table 226, and an address family (AF) table 222. Neighbor table 220 stores data about neighboring routers, namely, routers that are connected to PE router 102. The information in neighbor table 220 may include, but is not limited to, an IP address or prefix associated with or indicative of a neighboring router. Topology table 224 may contain an aggregation of routing tables gathered from all the neighbors. Topology table 224 may contain a list of destination networks together with their respective metrics. Topology table 224 may include, for every destination, a successor and a feasible successor if they exist. Destinations in topology table 224 may include a Passive/Active designation, where a Passive destination indicates that its routing is stable and PE router 102 knows the route to the destination. Active destinations occur when a topology has changed and PE router 102 is in the process of (actively) updating its route to that destination. Routing table 226 may store all or some of the actual network routes to destinations in the network. Routing table 226 may be populated from information in topology table 224 for every destination network that has an identified successor and optionally feasible successor. The successors and feasible successors serve as the next hop routers for these destinations In addition to the data tables described above, the computer program product modules illustrated in FIG. 2 include address family prefix limit table 242, and neighbor specific prefix limit table 240 and a maintenance module 228. As suggested by their names, address family prefix limit table 242 and neighbor specific prefix limit table 240 include information regarding the use of prefix limit data generally and, more specifically, the use of neighbor specific prefix data. The operation of some aspects of maintenance module 228 are described in greater detail with respect to FIG. 3 and FIG. 4.

In some embodiments, maintenance module 228 as shown in FIG. 2 is operable to implement selected features, aspects, or policies of PE router 102. For example, in the context of a PE router 102 operable to support prefix limiting, maintenance module 228 may include instructions that, when executed, cause PE router 102 to monitor for prefixes, to track any detected prefixes against prefix limits, and to take action when a prefix limit violation occurs.

Figure 3:
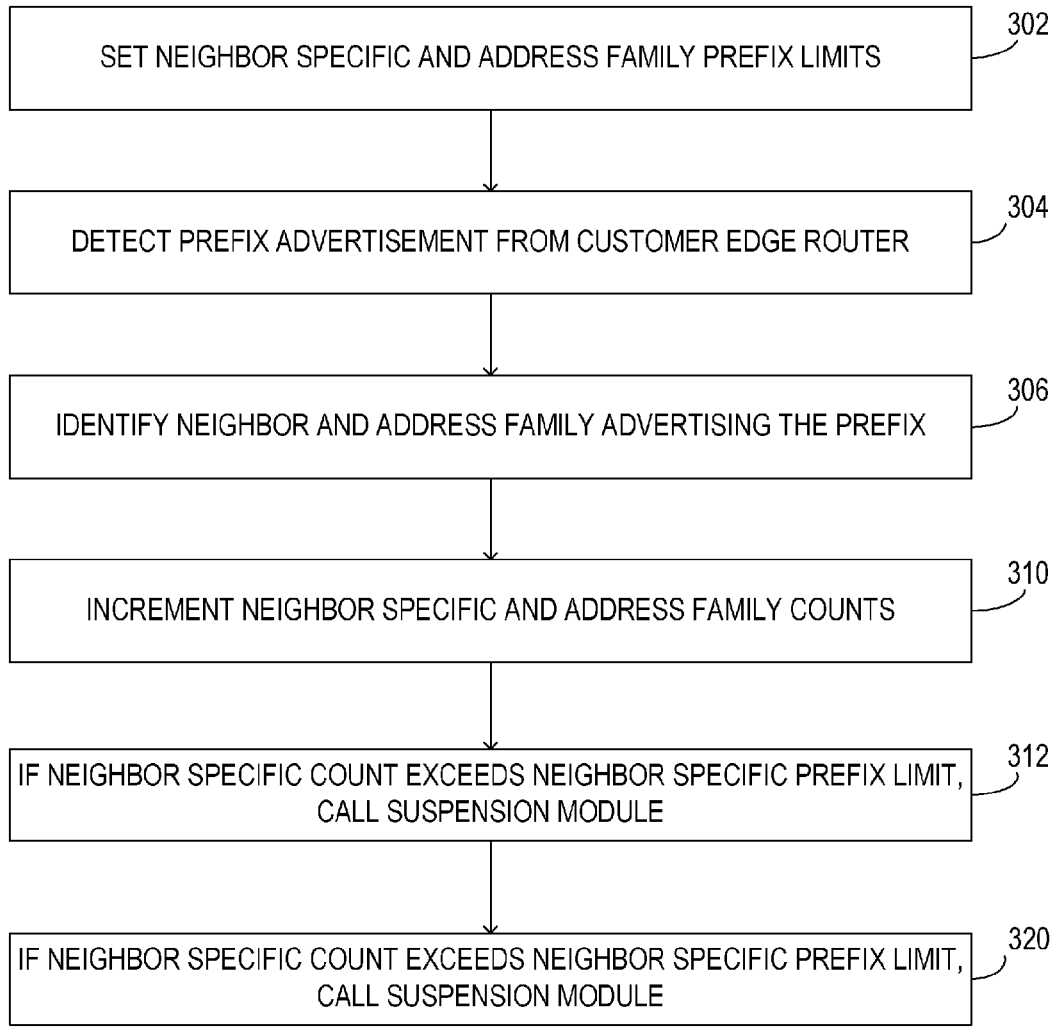
FIG. 3 is a flow diagram illustrating selected elements of an embodiment of a router method.

Referring now to FIG. 3, a flow diagram depicting selected elements of a method 300 for maintaining the stability of a PE router 102 is presented. Method 300 includes setting (block 302) prefix limits. In the depicted embodiment, block 302 includes setting at least two different prefix limits, namely, an address family prefix limit and at least one neighbor specific prefix limit. Depending upon the implementation, block 302 may include setting a neighbor specific prefix limit for any or all of the neighbors in an address family. The setting of prefix limits may occur when a PE router is booted or reset or at other times during the operation of the router. The limit values themselves may be determined and/or altered by an administrator of PE router 102. The limit values may assume a default value in the absence of a specific indication from an administrator. Statements or commands that set address family limits may be differentiated from statements or commands that set neighbor specific limits. For example, a neighbor specific prefix limit may be set by a command that includes the IP address of a specific neighbor whereas an address family prefix limit may omit IP addresses and, instead, indicate a logical reference to an address family.

In some embodiments, statements or commands that set prefix limits may include more than one parameter. For example, a statement or command that sets a prefix limit may include a maximum prefixes parameter, a restart timer parameter, a reset timer parameter, and a reset count parameter, each of which may have a default value. The maximum prefixes parameter may specify the number of prefixes that an address family or a specific neighbor may transmit during a specifiable time interval before a prefix limit violation occurs. The restart timer parameter may define or influence the duration of a suspension that occurs following a prefix limit violation. A reset timer parameter may define or influence the duration over which limit violations are measured. At the end of an interval determined by the reset timer parameter, prefix counts may be cleared or reset. The reset count parameter may define or influence a limit on the number of prefix limit violations that may occur before a permanent suspension is imposed. For purposes herein, a permanent suspension refers to a suspension that endures until the connection is manually re-established.

In block 304, method 300 includes detecting a prefix advertisement from a CE router 110 and identifying (block 306) the neighbor specific prefix data as well as any address family identification information. Method 300 further includes incrementing (block 310) a neighbor specific count and an address family count as needed to reflect an accurate number of counts associated with the CE router FIG. 3. If (block 312), the neighbor specific count for a particular neighbor exceeds a neighbor specific prefix limit applicable to the particular neighbor, method 300 as shown includes calling a suspension module (described in FIG. 4) to assess a suspension. The depicted implementation of method 300 further includes calling the suspension module if (block 320) a count associated with the address family exceeds the address family threshold. In some embodiments, the address family count may be cumulative of all neighbors in the address family. In such embodiments, there may be just one cumulative address family count for the entire address family and it is incremented any time any neighbor in the address family advertises a prefix. In other embodiments, individual address family counts are maintained for each neighbor. In this embodiment, an address family violation occurs when any one of the neighbors in the address family advertises prefixes in excess of the address family limit. In another embodiment, an address family prefix limit violation occurs when the cumulative address family count exceeds the defined limit.

Figure 4:
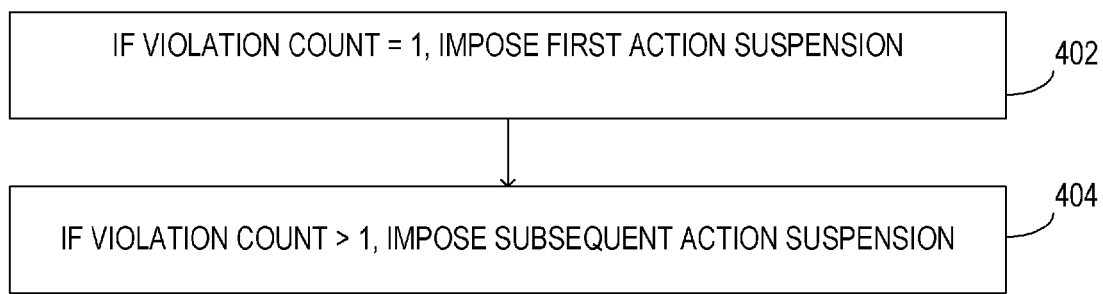
FIG. 4 is a flow diagram illustrating additional detail of selected elements of the flow diagram of FIG. 3.

Turning now to FIG. 4, a simplified flow diagram of a suspension module 400 called by method 300 when a prefix limit violation occurs is shown. The depicted embodiment of suspension module 400 includes imposing (block 402) a first action suspension if a violation count is equal to 1. In the case of a neighbor specific prefix limit violation, the violation count indicates the number of prefix limit violations associated with the applicable neighbor. In the case of an address family prefix limit violation, the violation count may indicate the number of address family prefix limits attributable to a specific neighbor. Alternatively, the violation count may indicate the number of prefix limit violations associated with the address family without regard to which specific neighbor contributed to the prefix limit violation. Although FIG. 4 as shown includes blocks for two different violation counts, namely, a first block for a first prefix limit violation and a second block (block 404) for subsequent violations, other embodiments may include additional blocks, for example, to differentiate between a second prefix limit violation, a third prefix limit violation, and so forth.

Thus, suspension module 400 encompasses functionality to adjust the suspension imposed depending upon the number of prefix limit violations that have occurred. In some embodiments, the suspension imposed may be more severe for second and subsequent prefix limit violations. For example, an exponential backoff may be implemented under which the initial limit violation incurs a suspension penalty that is not as severe as subsequent violations. Each subsequent violation may incur a progressively longer suspension duration. This approach may be used on individual peering sessions or over address-families as described below. These embodiments might encompass a policy that seeks to detect problematic CE routers early and rapidly increase the penalties imposed if the CE router turns out to be a repeat offender. Other embodiments of suspension module 400 may impose a relatively severe suspension initially and then less severe suspensions for subsequent prefix limit violations. This embodiment might be employed in a trusted environment under a theory that recognizes a repeat CE router offender as having a legitimate need to advertise prefixes in excess of the defined prefix limits. The particular model used in any given embodiment is an implementation detail, but the method encompasses the ability to adjust the suspensions imposed as the number of suspensions increases.

At the address-family level, a round-robin or progressive suspension method may be implemented. In one such method, an address family limit violation might result in the suspension of peering for the neighbor with the highest number of prefix advertisements, the neighbor with the second highest number of prefixes, and so forth until the prefix limit threshold is no longer violated. Also, with this method we would reestablish peering automatically using the inverse or last suspended first reestablished (last-in-first-out), this ensures a longer suspension duration is applied to the most aggressive violator.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A network management method, comprising:
    defining a family prefix limit and a family restart parameter applicable to a first address family, wherein the first address family includes a first set of family member routers neighboring a first router, wherein each of the first set of family member routers is connected to the first router and wherein the first set of family member routers comprises a plurality of less than all routers neighboring the first router, and wherein the family prefix limit comprises a cumulative limit on a number of prefixes advertised per specified interval of time by all family members;
    monitoring a set of family prefix counts, each corresponding to a different one of the family member routers, each indicative of prefixes advertised by the corresponding family member router;
    determining a cumulative family prefix count by summing together each of the family prefix counts; and
    responsive to detecting that the cumulative family prefix count exceeds the family prefix limit:
        selecting a particular family member router with the highest family prefix count;
        suspending a connection between the first router and the selected router for a suspension duration determined at least in part by the family restart parameter; and
        automatically resuming the connection after the suspension duration.

2. The method of claim 1, further comprising:
    defining a neighbor prefix limit and a neighbor restart parameter;
    monitoring prefixes advertised by each of the first set of family member routers individually; and
    responsive to a neighbor prefix violation, associated with a particular router in the first set of family member routers, indicating a count of all prefixes advertised by the particular router exceeding the neighbor prefix limit, suspending peering between the first router and the particular router for a duration determined at least in part by the neighbor restart parameter and thereafter automatically resuming connections between the first router and the particular router.

3. The method of claim 2, wherein the first router is a provider edge router associated with a service provider and each of the first set of family member routers is a customer edge router associated with a first customer of the service provider.

4. The method of claim 2, wherein each of the first set of family member routers is associated with a first customer of an operator of the first router.

5. The method of claim 2, wherein the first router is a provider edge router associated with a service provider and the first set of family member routers constitutes a virtual route forwarding entity recognized by the provider edge router.

6. The method of claim 1, further comprising monitoring a family restart count indicative of a number of times the family prefix count exceeds the family prefix limit, wherein the suspension duration is determined at least in part by the family restart count.

7. The method of claim 6, wherein the suspension duration applicable to each successive family prefix limit violation is greater than the suspension duration for a previous family prefix limit violation.

8. The method of claim 6, wherein the suspension duration applicable to each successive family prefix limit violation is less than the suspension duration for a previous family prefix limit violation.

9. The method of claim 6, further comprising, responsive to the family restart count exceeding a restart count limit, permanently suspending connections between the first router and the first address family.

10. The method of claim 1, wherein the first router supports an extended interior gateway routing protocol.

11. The method of claim 1, further comprising enabling family dampening wherein a decay factor is determined and used to influence the suspension duration when the family prefix limit occurs.

12. The method of claim 11, wherein the decay factor diminishes exponentially as a function of time.

13. A computer program product comprising computer executable network management instructions, stored on a non-transitory computer readable medium, wherein the instructions, when executed by a computer, cause the computer to perform operations comprising:
    maintaining family prefix counts for each of a plurality of a family member routers in a first address family, each of the family prefix counts indicative of a number of prefixes advertised by a corresponding family member router during a particular interval of time, the first address family comprising a first plurality of less than all customer edge routers connected to a provider edge router;

determining a cumulative family prefix count by summing together each of the family prefix counts;

responsive to detecting that the cumulative family prefix count exceeds a family prefix limit, applicable to all of the family member routers, within the particular interval of time;

selecting a particular family member router with the highest family prefix count;

determining a suspension duration;

suspending a connection between the particular family member router and the provider edge router; and automatically resuming the connections between the particular family member router and the provider edge router at a conclusion of the suspension duration.

14. The computer program product of claim 13, wherein determining the suspension duration includes determining the suspension duration based at least in part on a family restart parameter defined for the first address family.

15. The computer program product of claim 14, wherein determining the suspension duration includes determining the suspension duration based at least in part on a decay factor, wherein the decay factor is a function of an elapsed time when the prefix count exceeded the neighbor specific limit.

16. The computer program product of claim 15, wherein the decay factor diminishes exponentially with the elapsed time.

17. The computer program product of claim 14, wherein determining the suspension duration includes determining the suspension duration based at least in part on a value of a restart count wherein the restart count is indicative of a number of times the particular family member router has previously exceeded the family prefix limit.

18. The computer program product of claim 17, wherein determining the suspension duration includes increasing the suspension duration for each successive prefix limit violation.

19. The computer program product of claim 17, wherein determining the suspension duration includes decreasing the suspension duration for each successive prefix limit violation.

20. A network router suitable for use as a provider edge router, comprising:

a hardware processor;

a storage resource including a tangible computer readable medium accessible to the processor; and a plurality of ports operable to establish connections with external routers;

wherein the storage resource includes computer executable instructions that, when executed by the processor, cause the processor to perform operations comprising:

defining an address family prefix limit and an address family restart parameter applicable to a first address family, comprising a plurality of family member routers comprising less than all neighbor routers connected to the provider edge router;

monitoring a set of family prefix count counts, each corresponding to a different one of the family member routers, each indicative of prefixes advertised by a corresponding one of the family member routers;

determining a cumulative family prefix count by summing together each of the family prefix counts; and responsive to detecting that the cumulative family prefix count exceeds the address family prefix limit, selecting, in a round robin fashion, a particular family member router and suspending peering between the provider edge router and the particular family member router for a suspension duration determined at least in part by the restart parameter.

21. The network router of claim 20, wherein the operations include: monitoring a reset count indicative of a number of prefix limit violations, wherein the suspension duration is determined at least in part by the reset count.

22. The network router of claim 21, wherein the suspension duration for each successive neighbor specific limit violation is greater than a previous suspension duration for a previous neighbor specific limit violation.

23. The network router of claim 21, wherein the suspension duration for each successive neighbor specific limit violation is less than the suspension duration for a previous neighbor specific limit violation.

24. The network router of claim 20, wherein the provider edge router supports an extended interior gateway routing protocol.

25. The network router of claim 20, wherein the operations include: enabling dampening wherein a decay factor is determined when the neighbor specific prefix limit occurs.

26. The network router of claim 25, wherein the decay factor diminishes exponentially as a function of time.

* * * * *